United States Patent
Natori

(10) Patent No.: US 6,363,245 B1
(45) Date of Patent: Mar. 26, 2002

(54) PORTABLE COMMUNICATION TERMINAL WHICH JUDGES THE RECEPTION SITUATION BY LOWEST ERROR RATE

(75) Inventor: Makoto Natori, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/265,810

(22) Filed: Mar. 10, 1999

(30) Foreign Application Priority Data

Mar. 12, 1998 (JP) .......................... P10-061381

(51) Int. Cl.⁷ .............................................. H04B 17/00
(52) U.S. Cl. ...................... 455/226.3; 455/296; 455/575
(58) Field of Search ........................... 455/226.3, 226.4, 455/67.1, 63, 67.3, 283, 296, 575, 550

(56) References Cited

U.S. PATENT DOCUMENTS

| | | | | |
|---|---|---|---|---|
| 3,916,379 A | * | 10/1975 | Dulaney et al. ...... | 340/146.1 A |
| 4,710,924 A | * | 12/1987 | Chum .......................... | 371/4 |
| 5,138,616 A | * | 8/1992 | Wagner, Jr. et al. ......... | 371/5.1 |
| 5,386,589 A | * | 1/1995 | Kanai ......................... | 455/33.1 |
| 5,802,039 A | * | 9/1998 | Obayashi et al. ............ | 370/216 |
| 5,828,672 A | * | 10/1998 | Lanonte et al. ............... | 371/5.5 |
| 5,890,069 A | * | 3/1999 | Evans et al. ................. | 455/462 |
| 5,950,139 A | * | 9/1999 | Korycan ...................... | 455/566 |
| 6,018,651 A | * | 1/2000 | Bruckert et al. .......... | 455/277.1 |
| 6,035,183 A | * | 3/2000 | Todd et al. ............... | 455/226.2 |

FOREIGN PATENT DOCUMENTS

GB        2297885 A   *  8/1996   ............ H04Q/7/38

* cited by examiner

Primary Examiner—William Cumming
Assistant Examiner—C. Chow
(74) Attorney, Agent, or Firm—Jay H. Maioli

(57) ABSTRACT

A favorable communication state is set when communication different from a telephone conversation such as data communication and the like is carried out. A control unit (32) judges a reception situation detected by a reception situation detecting unit in comparison with a first threshold value and judges the same in comparison with a second threshold value. The reception situation based on the comparison with the first threshold value and the reception situation based on the comparison with the second threshold value in the control unit are notified of by respectively different notifying units (35) and (36).

5 Claims, 3 Drawing Sheets

PORTABLE COMMUNICATION TERMINAL WHICH JUDGES THE RECEPTION SITUATION BY LOWEST ERROR RATE

BACKGROUND OF THE INVENTION

1. Field of the Invention

The present invention relates to a portable communication terminal such as a portable telephone terminal and the like for carrying out a radio communication.

2. Description of the Related Art

Various kinds of portable telephone terminals are in practical use, which carry out radio communication with a predetermined radio base station and carry out a telephone conversation with a counterpart connected through its base station. Here, a precondition for the portable telephone terminal to be able to carry out the telephone conversation is such that it exists within an area capable of carrying out the radio communication with the base station. Therefore, a display panel (a liquid display and the like) with which the portable telephone terminal is provided is made to display reception circumstances of radio waves from the base station in a plurality of stages while a user ascertains its display and judges if the terminal is in a state of being able to receive transmission from the terminal and a call from the base station.

As for the display of the reception situation by this display panel, depending on, for example, a reception level of radio waves from the base station, displays in a plurality of stages, about four stages, are carried out; displays are made in a plurality of stages from a situation where it is entirely impossible to carry out a telephone conversation with the base station to a situation where it is possible to most favorably carry out a telephone conversation. For example, in a case of a portable telephone terminal for a radio telephone system, error rates (error rate) of reception data are divided into 4 stages with three values, 0.3%, 1% and 3% serving as boundaries, thereby making displays in the 4 stages. Generally speaking, at a time of transmitting audio data on a telephone conversation, if an error rate is lower than a value of as much as 0.3%, it is possible to carry out voice transmission of quality which is not detrimental to the telephone conversation.

Meanwhile, situation of the portable telephone terminal sometimes become worse due to some kinds of impediments, circumstances of radio waves and the like even if it is situated comparatively near to, for example, a base station. In such cases, the reception situation is improved on many occasions by simply changing a position or a direction (in correct terms, a position or a direction of an antenna attached to a terminal) of the portable telephone terminal.

On the other hand, there have been carried out various kinds of data communications such as transmission and reception of electronic mail data, browsing of various kinds of home pages of the internet and the like by connecting the portable telephone terminal with some kind of a data communication network side via a telephone circuit after connecting the portable telephone terminal with a small-size information processing terminal (for example, a note-type personal computer device, an electronic notebook device and the like).

By the way, when the above-mentioned data communication is carried out by using the portable telephone terminal, it is desirable that there are no transmission errors, and even if there are transmission errors, only a very few of them can be permissible as long as they are nearly perfectly corrected by an error correcting code attached to the transmission data. That is, when there are errors in the data received by way of data communication, it becomes impossible to carry out a correct display of an electronic mail or the like, which is not desirable.

Here, a reception level display with which the portable telephone terminal is provided, is, as mentioned above, a level display with a state capable of transmitting telephone conversation voice being a reference, but even when a display of some conditions at the highest level (for example, a display corresponding to less than 0.3% in the error rate of reception data) in terms of the reception level display is being carried out, favorable data communications can not be carried out in many circumstances as there is a case where an error rate is inappropriate for the data communication. For example, when the reception data error rate is 0.3%, the most favorable state is displayed as a reception level display of the terminal, but the error rate is still too high for the data communication, thereby giving rise to errors in the reception data or entailing a problem that a data transmission rate is lowered in order to carry out a retransmission process of the data in which errors have been found.

In order to solve these problems, a method is conceivable, in which the reception level displays by, for example, a display panel, with which the portable telephone terminal is provided, are carried out in more detailed stages to be able to judge whether or not there is an appropriate circumstance for data transmission, but when time for an audio telephone conversation by means of voice is considered, even though conditions suited for a telephone conversation are in place, levels are displayed in a plurality of stages, which leads to unnecessarily detailed displays, thereby incurring a problem to have embarrassed a user. Also, even when detailed level displays are carried out, it has been difficult for a user side to easily judge what extent of a level or above is suited for the data communication.

Meanwhile, here, an explanation has been made by exemplifying the portable telephone terminal for a radio telephone circuit, but the same problem resides with a case of a portable communication terminal for a radio communication circuit other than the radio telephone circuit.

SUMMARY OF THE INVENTION

An object of the present invention is, in view of such the points, to make it possible to simply set a favorable reception state when communications such as the data communication and the like different from a telephone conversation are carried out.

A first aspect of the present invention is arranged such that reception circumstances detected by a reception circumstances detecting unit is judged by a control unit in comparison with a first threshold value as well as a second threshold value, and reception circumstances based on comparison with the first threshold value by the control unit and reception circumstances based on comparison with the second threshold value by the control unit are notified by respectively different notifying units.

With such the arrangement, for example, a notifying unit of reception circumstances based on the comparison with the first threshold value can carry out a notification process of reception circumstances suited for an audio telephone conversation and a notifying unit of reception circumstances based on comparison with the second threshold value can carry out a notification process of reception circumstances suited for data communication.

A second aspect of the present invention comprises a control unit which retains the best reception circumstances value detected by the reception circumstances detecting unit and compares the retained reception circumstances value with a reception circumstances value detected by the reception circumstances detecting unit and a notification unit which, when the control unit detects a reception circumstances value almost equivalent to the reception value retained by the control unit, notifies the fact.

With such the arrangement, it is possible to judge the most favorable reception circumstances for a position at any given time as the reception circumstances almost equal to the retained best reception state is notified.

DESCRIPTION OF THE PREFERRED EMBODIMENT

Hereafter, an embodiment of the present invention will be explained with reference to attached drawings.

Figure 1:
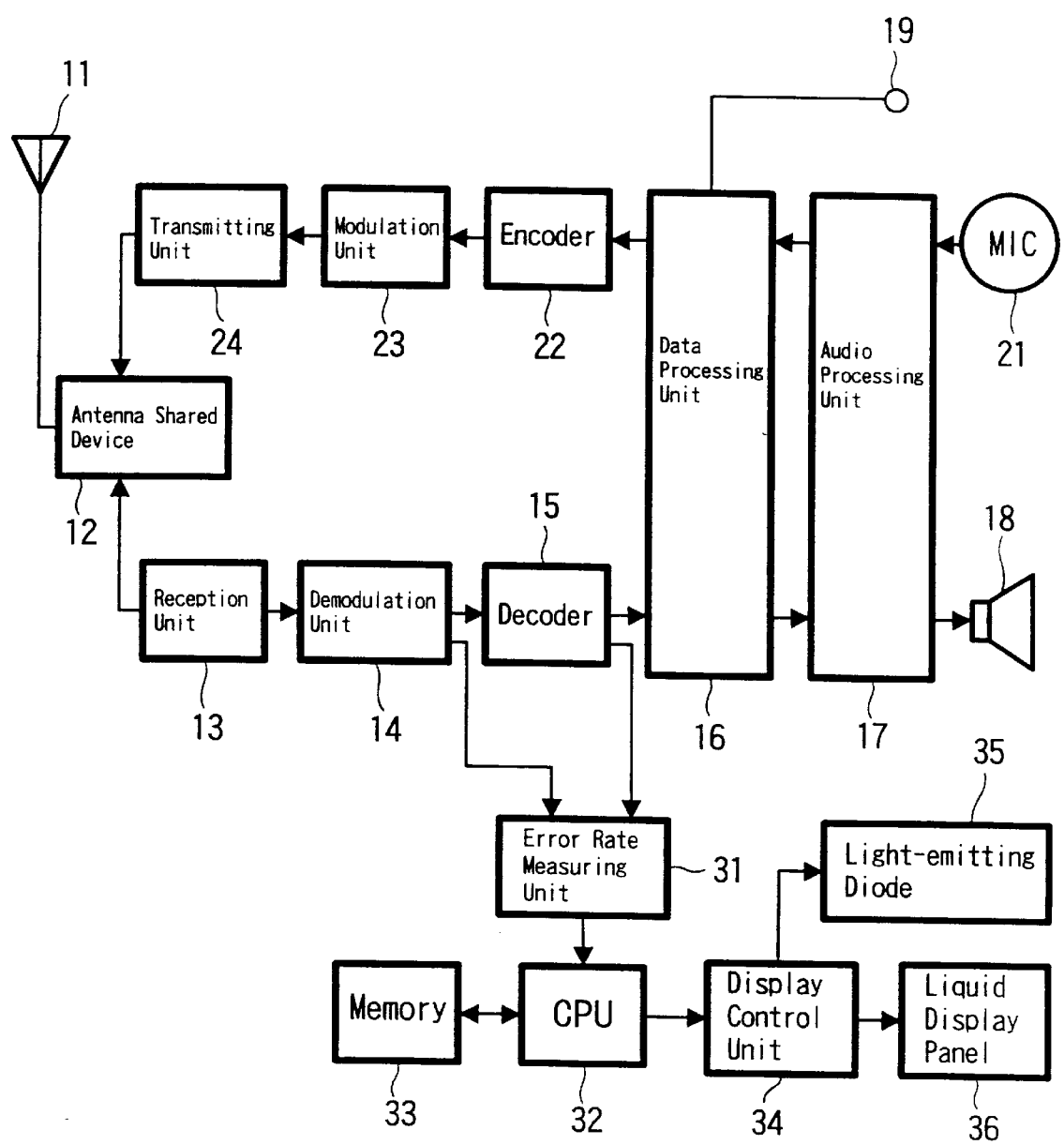
FIG. 1 is a block diagram showing one example of an arrangement according to an embodiment of the present invention.

FIG. 1 is a block diagram showing an arrangement of a portable telephone terminal according to an example of the present invention and here, an arrangement is cited as a portable telephone terminal for a radio telephone system. The arrangement will be explained. An antenna 11 is connected to a reception unit 13 through an antenna commoner 12 which carries out a reception process for receiving a signal with a predetermined frequency out of signals received by the antenna 11. Then, a received signal outputted by the reception unit 13 is supplied to a decoding unit 14 to be decoded and the decoded output is supplied to decoder 15 to decode transmitted data. An output by the decoder 15 is supplied to a data processing unit 16 to be subjected to a data process necessary for reception. As for a data process here, when audio data is included in the received data, the audio data is subjected to an extracting process and supplied to an audio processing unit 17. The audio processing unit carries out a process to make the audio data an analog audio signal and the processed analog signal is supplied to a speaker 18 for sound emitting.

An audio signal picked up and outputted by a microphone 21 is supplied to the audio processing unit 17 to be made into digital audio data and the digital audio data is supplied to the data processing unit 16 to be made into a data arrangement for transmission. Then, the data for transmission outputted by the data processing unit 16 is supplied to an encoder 22 to be subjected to an encoding process and the processed signal is supplied to a modulating unit 23 to be subjected to a modulating process and the modulated signal is supplied to a transmitting unit 24 to be made into a transmitting signal with a predetermined transmitting frequency, which is supplied to the antenna 11 through the antenna commoner 12 for radio transmission.

Up to now, a processing system for a telephone conversation voice has been explained, but when various kinds of data communications are carried out over a radio telephone circuit, a process of a reception system is such that same processes are carried out from the reception unit 13 to the decoder 15 as when audio data is received and data transmitted from the data processing unit 16 is extracted and the extracted data is made to be outputted from a data input and output terminal 19. Also, as for a process of a transmission system, data inputted from the data input and the memory 33 output terminal 19 is made a data arrangement for transmission by the data processing unit 16 and the data processed by the data processing unit 16 is supplied to the encoder 22 and the same processes are carried out from the encoder 22 to the transmitting unit 24 for radio transmission as when the audio data is transmitted.

These reception and transmission processes are carried out based on the control by a central control unit (CPU) 32 which is a micro-computer for carrying out operations control at each portion of the portable telephone terminal. Details about a control arrangement by the central control unit 32 is omitted. Here, this example has such an arrangement that there is provided an error rate measuring unit 31 which measures an error rate of reception data based on an output by the demodulating unit 14 and an output by the decoder 15, and based on a measuring output by an error rate measuring unit 31, the central control unit can judge reception circumstances.

The error rate measuring unit 31 measures an error rate which is the error rate of reception data from the error information outputted by the demodulating unit 14, and correcting information and frame check information outputted by the decoder 15. The error rate to be measured is, for example, a frame error rate (FER) to be measured for showing a rate of errors in each frame data and a bit error rate (BER) to be measured for showing an error rate for every bit, and values of the measured error rates are supplied to the central control unit 32. A memory 33 for temporarily memorizing the values of the measured error rates is connected to the central control unit 32 and temporarily memorizes the error rate value when a data communication mode is put in place.

The central control unit 32 compares a supplied error rate value with a preset threshold value, and based on whether it is large or small in relation to the threshold value, carries out a process to display a reception level. As for a means to display, there are provided a light-emitting diode 35 to luminesce in a predetermined color (for example, green) and a liquid display panel 36 for displaying a reception level in patterns together with numerals of predetermined digits and letters, and a display control unit 34 controls the luminescing display by the light-emitting diode 35 and the display by the liquid display panel 36 based on a command from the central control unit 32.

Here, in this example, two kinds of threshold values are set: a reception level display threshold value for displaying on the liquid display panel 36 and a reception level display threshold value for displaying by the light-emitting diode 35. As for the reception level display threshold value for displaying in the liquid display panel 36, threshold values in a plurality of stages are set, and by comparing a threshold value with a measured error rate, reception levels are displayed in a plurality of stages. The threshold values in a plurality of stages to make the liquid display panel display are, for example, when an error rate is smaller than a threshold value for a lowest error rate, set to the extent telephone conversation audio data of nearly favorable quality can be transmitted. Concretely, for example, when threshold values are set in three stages, values to the extent of 0.3%, 1% and 3% are set as respective threshold values and with the values in three stages as boundaries, the present error rates are divided into four stages, which are displayed by bar-shaped graphs on the liquid display panel 36.

Figure 2:
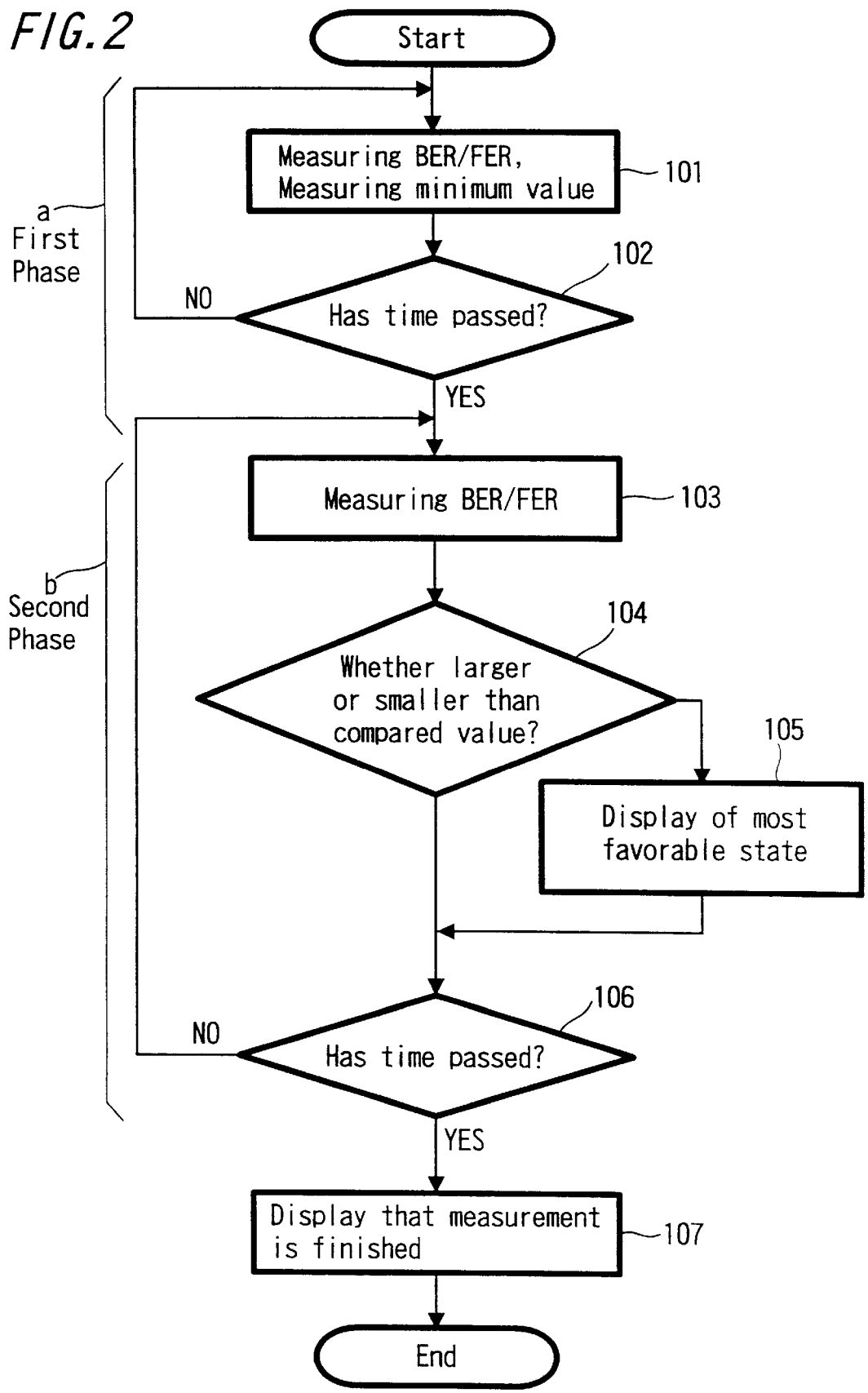
FIG. 2 is a flowchart showing an example of a state of a measuring process according to an embodiment of the present invention.

Then, a reception level displaying threshold value set in the central control unit 32 for displaying by the light-emitting diode 35 is, here, when a measuring mode is set, so arranged to be variably set depending on the reception at that time. The measuring mode is a mode for measuring a position at which it is possible to most appropriately carry out reception by changing a direction of a portable telephone terminal. FIG. 2 is a flowchart showing a measuring process under control of the central control unit 32 at a time when the measuring mode is set. In the following explanation the process will be explained according to the flowchart. The measuring mode process is divided into processes in two stages: a process at first phase a and a process at a second phase b.

As for a process at the first phase a, when the measuring mode is set by a predetermined operation of a key of the portable telephone terminal or the like, the first phase a is first set, in which the error rate measuring unit 31 carries out measurement of the frame error rate (FER) or the bit error rate (BER) and the memory 33 is made to memorize the minimum value of the error rate then by the central control unit 32 (step 101). Then, the time which has passed since the process at the first phase a is started is judged (step 102), and it is judged whether or not a first time (for example, a time as long as some ten seconds) has passed. Here, when the first time has not passed, the measurement of the minimum value of the error rate and the memorization process at step 101 are continuously carried out and when the central control unit 32 judges that the first time has passed at step 102, the processing proceeds to a process at the second phase b.

As for a process at the second phase b, the error rate measuring unit 31 measures the frame error rate (FER) or the bit error rate (BER) (step 103) and the measured value at that time is compared with the minimum value memorized by the memory 33 at step 101 of the first phase a (step 104). When the value is a value nearly equivalent to the memorized minimum value or a value smaller than the minimum value, the light-emitting diode is made to luminesce by a command from the central control unit to display that a worst state is in place (step 105). Then, when the displaying process by the light-emitting diode 35 is carried out or it is judged at step 104 that the measured value is larger than the minimum value memorized by memory 33, the time since the process at the second phase b is started is judged (step 106) to judge whether or not the second time (for example, as long as some ten seconds) has passed. Here, when the second time has not passed, the processing returns to the measuring process of the error rate at step 103 and when the second time has passed, a fact that a measuring mode process is finished is made to be displayed in letters and the like on the liquid display panel by a command of, for example, the central control unit 32 (step 107).

Figure 3:
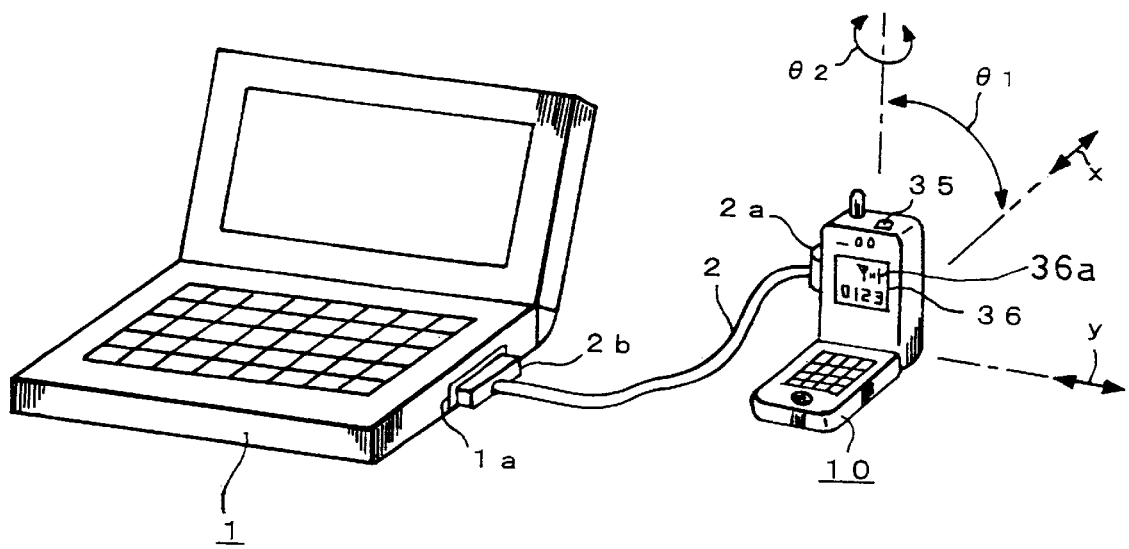
FIG. 3 is a perspective view showing one example a usage state according to an embodiment of the present invention.

Here, an explanation will be given about how to set a direction of the portable telephone terminal of this example or the like by actually setting a measuring mode. For example, as shown in FIG. 3, a portable telephone terminal 10 of this example is connected to an information processing terminal 1 such as a note-type personal computer device and the like with a predetermined connecting cable 2. As for connecting then, for example, a terminal portion 2a at one end of the connecting cable 2 is connected to the data input and output terminal 19 (refer to FIG. 1) of the portable telephone terminal 10. Also, a card 2b with a predetermined standard (for example, the PCMCIA standard) is connected to the other end of the connecting cable 2 and the card 2b is inserted into a card slot 1a of the information processing terminal 1. By connecting in this manner, data to be dealt with by the information processing terminal 1 can be received through a telephone circuit connected by the portable telephone terminal 10 or transmitted through the telephone circuit. Meanwhile, in the example of FIG. 3, a reception level displaying unit 36a is provided in the liquid display panel 36 and a normal reception level display is carried out by the reception level displaying unit while the light-emitting diode 35 is disposed at a position (here, at an upper portion of the terminal 10) apart from the liquid display panel 36.

In a case where data communications are carried out in this manner by connecting the portable telephone terminal with the information processing terminal 1, it is necessary to install the portable telephone terminal at a position or a direction at which it is in a state of being able to most favorably carry out radio communication (that is, the error rate is in a lowest state). In this case, the above-mentioned measuring mode is set. At first, the measuring mode is set and during the first phase period, for example, a user is supposed to grab (have) the portable telephone terminal 10 and move its position a little from where it is positioned and change its direction. For example, as shown in FIG. 3, a tilt angle $\theta_1$ of the terminal 10 is changed, an angle $\theta_2$, at which the front of terminal 10 is directed, is changed, or the position of the terminal 10 is changed in an x direction or a y direction. By moving the position in this manner, an error rate at a time when a reception state of radio waves from a base station is most favorable is memorized by the memory 33 within the portable telephone terminal 10.

Next, when the second phase period comes, a user keeps an eye on a state of the light-emitting diode 35 while again changing the position or the direction of the portable telephone terminal 10 and fixes the position of the portable telephone terminal 10 at a position or in a direction at which the light-emitting diode 35 luminesces. By doing so in this manner, it is possible to put the portable telephone terminal 10 in a state that the reception situation (and transmission situation) become most favorable in the neighborhood of the position then as well as carry out the data communication in the most favorable state, thereby making it possible to prevent an occurrence of a transmission error and lowering of the transmission rate.

Meanwhile, according to the above-mentioned embodiment, as a means to notify of a favorable reception when the measuring mode is in place, the luminescence of the light-emitting diode is used as a notifying means, but other means may also be used. For example, it is recommendable to have a liquid display panel and the like display the favorable reception circumstances with letters, figures and the like. Also, an arrangement is recommendable in which some sounds may be used to notify of the favorable situation.

Also, according to the above-mentioned embodiment, there is provided an arrangement such that only when there is a nearly same state as a memorized reception state, notification is carried out by luminescence and the like, but the notification may also be arranged to be made in a plurality of stages. For example, in a case where an arrangement is put in place in which the notification is carried out by the luminescence, when there is a state nearly equivalent to that with the lowest error rate memorized by the memory 33, the light-emitting diode may be made to luminesce in a first color (for example, green), and when there is an error rate a little higher than that state, the light-emitting diode may be made to luminesce in a second color (for example, orange), thereby making it known that the lowest error rate is approaching. Also, in a case of an arrangement where notification by sounds is carried out, it may be arranged that the same notification in a plurality of stages like this is carried out at intervals of outputted sounds or with changes of a sound pitch or the like.

Also, according to the above-mentioned embodiment, an arrangement is cited in which only when the process explained by the flowchart of FIG. 2 is carried out by setting the measuring mode, the light-emitting diode 35 is made to luminesce and notifies of the favorable reception state by the luminescence (display), but it is recommendable that when the light-emitting diode 35 is in a state suited for data communication, the state may be displayed by the luminescence regardless of setting of the measuring mode.

That is, as a threshold value for the central control unit 32 to compare with an error rate measured by the error rate measuring unit 31, a threshold value for judging whether or not the light-emitting diode 35 is made to luminesce is made to be memorized in advance other than a threshold value (for example, the three threshold values for displaying in the above-mentioned four stages) for carrying out a display of the reception level (for example, the display by the displaying unit 36a) by the liquid display panel 36. In this case, the threshold value for the liquid display panel 36 to carry out the reception level display is fundamentally for a level display to show that transmission of audio data for a telephone conversation is favorably carried out, and a value of nearly 0.3% is set as a threshold value of the lowest error rate, but as a judging threshold value for having the light-emitting diode 35 luminesce, a smaller value than this value is set (for example, a smaller error rate by as many as three digits) for making a display to show that data communication can be favorably carried out.

Then, when the central control unit 32 judges that the error rate measuring unit 31 has measured an error rate fewer than the threshold value for judging whether or not the light-emitting diode 35 is made to luminesce, the display control 34 unit makes the light-emitting diode 35 luminesce by a command from the central control unit 32.

With such an arrangement, when a telephone conversation is carried out by means of voice, for example, as is the case with the displaying unit 36a shown in FIG. 3, a communication state with the base station is judged by the level displays in a plurality of stages, which use a part of the liquid display panel 36 and for example, when the display panel 36 displays a state in which the most favorable reception situation is displayed, it is judged that a telephone conversation by means of voice can be favorably carried out, and also, when data communication is carried out by connecting with a portable information terminal, it is judged that favorable data communication can be possible by carrying out the communication while the light-emitting diode 35 is in a state of luminescing, thereby making it possible to favorably judge if states are suited for respective communication modes.

Meanwhile, even in a case where a fixed threshold value for data communication only is set in this manner, and a notification process by the light-emitting diode or the like based on comparing the threshold value with a detected error rate is carried out, other notification means (notification with display by letters and figures, and notification with an output of sounds) may be used. Also, in a case where the notification for data communication is carried out, notifications in a plurality of stages may be carried out.

Also, according to the above-mentioned embodiment, the notification is made to be carried out by judging the reception circumstances (communication circumstances) from the error rate which is an error rate of reception data, but the notification may be carried out by judging the reception situation from a detecting state of other reception state.

Further, according to the above-mentioned embodiment, an explanation has been made about an example in which the present invention is applied to the portable telephone terminal for the radio telephone circuit, but the present invention can be naturally applied to other portable communication terminals for radio communication in a case where a notification is carried out by detecting a reception state of the terminal.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A portable communication terminal, comprising:

a reception processing unit for carrying out a reception process of a radio signal;

a reception situation detecting unit for detecting a reception situation in said reception processing unit based on one of a bit error rate and a frame error rate of the reception process;

a control unit for judging the reception situation detected by said reception situation detecting unit in comparison with a first threshold value and in comparison with a second threshold value, wherein the first threshold value corresponds to a lowest error rate for reliable transmission of audio signals and the second threshold value corresponds to a lowest error rate for reliable transmission of digital data;

a first notifying unit for notifying a user of the reception situation based on the comparison with the first threshold value and that the transmission of audio signals can be favorably carried out; and a second notifying unit for notifying a user of the reception situation based on the comparison with the second threshold value and that the transmission of digital data can be favorably carried out.

2. The portable communication terminal as claimed in claim 1, wherein level displays in a plurality of stages are carried out on a display panel with which a portable panel is provided as a notification of the reception situation by said first notifying unit, and wherein a notifying means other than the display panel is used to notify of the reception situation in the second notifying unit.

3. The portable communication terminal as claimed in claim 1, wherein the control unit retains a best reception situation value detected by the reception situation detecting unit and compares the retained best reception situation value with a reception situation value detected by the reception situation detecting unit and notifies the user using one of the first and second notifying units.

4. The portable communication terminal as claimed in claim 3, wherein detection of the best reception situation value is carried out during a first predetermined time, and wherein within a period of a second predetermined time after the first predetermined time, the control unit carries out a comparison of the retained reception situation value with the reception situation value detected by the reception situation detecting unit.

5. The portable communication terminal as claimed in claim 3, wherein the second notifying unit comprises predetermined sounds output means.

* * * * *